US006539212B1

(12) United States Patent
Kamalski

(10) Patent No.: US 6,539,212 B1
(45) Date of Patent: Mar. 25, 2003

(54) RADIO BROADCASTING SERVICE, A TRANSMITTER AND A RECEIVER FOR USE IN SUCH A SYSTEM, A RADIO BROADCASTING METHOD AND A RADIO BROADCASTING SIGNAL, IN WHICH A DATA SIGNAL ACCOMPANYING A PROGRAM SIGNAL INCLUDES DATA OF A DATA SERVICE AND INFORMATION PERTAINING TO THE DATA SERVICE

(75) Inventor: Theodor I. E. Kamalski, Eindoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1042 days.

(21) Appl. No.: 08/735,159

(22) Filed: Oct. 22, 1996

(30) Foreign Application Priority Data

Oct. 24, 1995 (EP) ........................................ 95202869

(51) Int. Cl.[7] ........................................ H04B 1/18

(52) U.S. Cl. ........................ 455/186.1; 455/151.1; 455/161.2; 455/70

(58) Field of Search ........................ 455/186.1, 45, 455/70, 3.2, 151.1, 161.2, 186.2, 166.1, 42, 150.1, 161.1

(56) References Cited

U.S. PATENT DOCUMENTS 5,065,452 A * 11/1991 Duckeck et al. ......... 455/226.1
5,146,612 A * 9/1992 Grosjean et al. .............. 455/45
5,303,393 A * 4/1994 Noreen et al. ............. 455/12.1
5,345,602 A * 9/1994 Wiedmann et al. ...... 455/186.1
5,404,588 A * 4/1995 Henze ......................... 455/45
5,442,646 A * 8/1995 Chadwick et al. ............ 455/45
5,497,372 A * 3/1996 Nankoh ................... 455/186.1
5,507,024 A * 4/1996 Richards, Jr. ................ 455/45
5,559,550 A * 9/1996 Mankovitz ..................... 348/6
5,581,576 A * 12/1996 Lanzetta et al. .............. 455/45
5,584,051 A * 12/1996 Goken ......................... 455/68

FOREIGN PATENT DOCUMENTS

DE 4233210 A1 4/1994
EP 0263253 A2 7/1987
GB 2251767 A 10/1991

* cited by examiner

*Primary Examiner*—Vivian Chin
*Assistant Examiner*—Edan Orgad
(74) *Attorney, Agent, or Firm*—Edward W. Goodman

(57) ABSTRACT

A radio broadcasting system, transmitter, receiver, method and signal are provided wherein a program signal is combined with a data signal. According to the invention the data signal not only includes information on an indicated program signal, but also data of a data service and information on the data service, such as an identification of the data service, alternative frequencies, information on related data services etc. In this way it is possible to broadcast the data service on a network differing from the network broadcasting the program signal. This is of particular use in the Radio Data System.

9 Claims, 5 Drawing Sheets

RADIO BROADCASTING SERVICE, A TRANSMITTER AND A RECEIVER FOR USE IN SUCH A SYSTEM, A RADIO BROADCASTING METHOD AND A RADIO BROADCASTING SIGNAL, IN WHICH A DATA SIGNAL ACCOMPANYING A PROGRAM SIGNAL INCLUDES DATA OF A DATA SERVICE AND INFORMATION PERTAINING TO THE DATA SERVICE

BACKGROUND OF THE INVENTION

1. Field of the Invention

The invention relates to a radio broadcasting system comprising a transmitter and a receiver for transmitting and receiving at least one program signal and a data signal, the data signal comprising information pertaining to an indicated program signal.

The invention relates to a radio broadcasting transmitter for transmitting at least one program signal and a data signal, the data signal comprising information pertaining to an indicated program signal.

The invention also relates to a radio broadcasting receiver for receiving at least one program signal and a data signal, the data signal comprising information on an indicated program signal.

The invention further relates to a radio broadcasting method for transmitting and receiving at least one program signal and a data signal, the data signal comprising information pertaining to an indicated program signal.

Furthermore the invention relates to a radio broadcasting signal comprising at least one program signal and a data signal, the data signal comprising information pertaining to an indicated program signal.

2. Description of the Related Art

Such a radio broadcasting system is known from the Specification of the Radio Data System (RDS), as published in April, 1992, CENELEC under Ref. No. EN 50067:1992. In this FM radio broadcasting system, the program signal is frequency modulated on a carrier, and the data signal is modulated on a subcarrier of 57 kHz and comprises information on a program signal indicated in the data. This indicated program signal can be the accompanying program signal or a program signal related to the accompanying program signal. This information comprises an identification of the network the indicated program signal is broadcast on, alternative frequencies on which the same program signal can be received, linking information for a switch-over to another network comprising traffic information related to the network broadcasting the program signal, etc. In general, this information relates to an infrastructure for the same or related program signals. This means that when a data service is incorporated in the information in the data signal, this data service will share the same infrastructure as the program signal.

SUMMARY OF THE INVENTION

An object of the invention is to provide a radio broadcasting system in which a data service in the data signal is no longer restricted to the infrastructure related to the program signal.

A radio broadcasting system according to the invention is characterized in that the data signal further comprises data of a data service and information pertaining to said data service.

A transmitter according to the invention is characterized in that the data signal further comprises data of a data service and information pertaining to said data service.

A receiver according to the invention is characterized in that the data signal further comprises data of a data service and information pertaining to said data service.

A method according to the invention is characterized in that the data signal further comprises data of a data service and information pertaining to said data service.

A signal according to the invention is characterized in that the data signal further comprises data of a data service and information pertaining to said data service.

The invention is based on the recognition that by adding data of a data service to the data signal together with information on the data service, it is possible to broadcast the data service on a network of transmitters substantially differing from the network broadcasting the program service. In this way, for example, the area coverage for the data service can be made different from the area coverage for the program signal. This results in increased flexibility for a service provider, providing the data service. The information pertaining to the data service may comprise an identification of the data service, alternative frequencies on which the data service is also being broadcast, information on the area coverage of the data service, etc.

An embodiment of the radio broadcasting system according to the invention is characterized in that said system is the RDS system. An example of a radio broadcasting system wherein the invention is of particular advantage is the Radio Data System.

An embodiment of the radio broadcasting system according to the invention is characterized in that the data signal is organized in groups having a group type code for distinguishing between different types of data, and groups having the same group type code are used for transmitting the data of said data service and the information pertaining to said data service. By this measure, the data and the information of a particular data service are grouped together using the group type code. This allows, at the receiver, a simple and effective recognition of groups of data belonging to the data service. An example of such a code is the Group Type Code as used in the Radio Data System.

An embodiment of the radio broadcasting system according to the invention is characterized in that a group comprises a data bit for distinguishing remaining data bits as either comprising data of the data service or information pertaining to said data service. This allows a simple way for a receiver to distinguish between the data of a data service and the information pertaining to the data service.

An embodiment of the radio broadcasting system according to the invention is characterized in that the information pertaining to said data service comprises information on a related data service. In this way, it is possible to link a data service to other data, services which carry related data. Now it is possible to gather desired data which is transmitted on several data services and consequently on several networks.

An embodiment of the radio broadcasting system according to the invention is characterized in that the information pertaining to the related data service comprises switching information for switching the tuning of the receiver to a frequency for receiving the related data service. This allows a reliable switch-over from one network carrying the data service to another network broadcasting the related data service. Such switching information may comprise alternative frequencies on which the related data service can be received, an identification of the service provider providing the related data service, an identification of the related data service, etc. The switching information can also comprise trigger information for the switch-over. In this case, a receiver can determine the moment a switch-over should take place and possibly the duration of the switch-over as well (if such information is provided).

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

Figure 1:
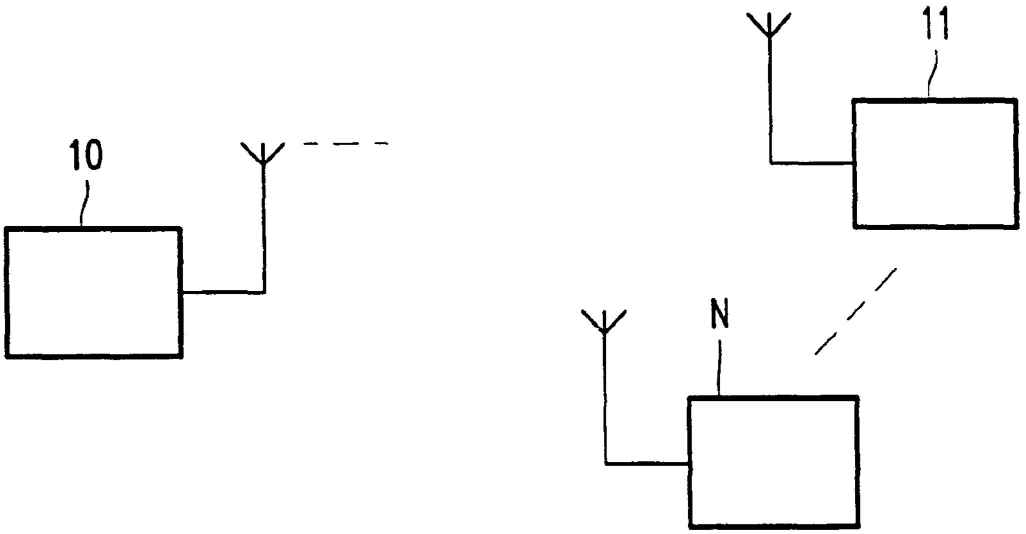
FIG. 1 shows a diagram of a radio broadcasting system according to the invention.

The invention provides a system for transmitting data, the data being part of a data service. The invention also provides a transmitter and a receiver for use in such a system. The invention further provides methods for transmitting and receiving such data. The invention also provides a signal comprising such data.

When a data service is transmitted using a plurality of transmitters, it may be desirable for a receiver to be able to select the strongest transmitter for reception of the data service. For this purpose, the receiver needs to know the alternative frequencies on which the data service can be received. Furthermore, it may be desirable to provide extensive information on the data service provided. This allows a receiver to determine if the data service can be processed and/or if it is the desired data service. Additionally, when, at times, the data service is not able to provide all the desired data, a part of this desired data may be available on another network. Thus, it would be desirable to provide some kind of link to this other network, so that the receiver can automatically switch over to the other network for reception of the desired data and switch back again after reception. In general, the invention provides a data service, which includes supplementary information on that data service. This supplementary information may comprise information on the service itself, for instance:

an identification of the data service, an identification of the service provider, an identification of the area coverage of the data service.

The supplementary information may also provide information on the frequencies on which the data service may be received, analogous to the Alternative Frequencies feature provided in RDS. This allows a receiver receiving the data service to find the best reception possible. Furthermore, the supplementary information may provide linking information for linking the data service to other data services. This is useful in those situations that the data service itself is not able to provide all necessary information, but where the missing information can be found on another data service, linked to the present one. The invention is especially useful in a system wherein a program signal and a data signal are transmitted, the data signal comprising data of the data service. The data signal further comprises program-related information, such as information on alternative frequencies of the program, and identification of the program etc. However, this program-related information may not be usable for the data service. In fact, the service provider providing the data service may be totally different from the program provider. Furthermore, the data service may be transmitted on a network of transmitters, which differs from the network of transmitters transmitting the program signal. Thus, the program-related information may not be applicable to the data service, which means a.o. that the alternative frequencies provided in the program-related information cannot be used for finding the best reception of the data service. Thus, the invention provides a data service which can be treated separately from an accompanying program signal.

FIG. 1 shows a diagram of a radio broadcasting system according to the invention. The system comprises a transmitter 10, being arranged for transmitting a data service and supplementary information on the data service. The transmitter is arranged for simultaneously transmitting a program signal. In this case the data service is modulated on a subcarrier with a suitable modulation and added to the program signal, before modulating a carrier. The system further comprises at least one receiver 11, and possibly a plurality of receivers 11 . . . N. The receivers are arranged for reception of the data service and the supplementary information on the data service. Furthermore, the receiver 11 is arranged for processing of data transmitted in the data service according to a data type identified by the data service or in the supplementary information. The receiver 11 is also arranged for processing of the supplementary information. Examples hereof will be given later in the description.

A system, in which the present invention can be applied, is the Radio Data System. The Radio Data System provides a data signal, modulated on a 57 KHz subcarrier. The modulated subcarrier, together with a program signal, is frequency modulated onto a carrier. The data signal in RDS is organized in groups of 104 bits each, each group being divided into 4 blocks of 26 bits, with 16 data bits and 10 bits reserved for a checkword and offset. Each group carries 37 free bits: 5 bits in the second block and 16 bits in each of the third and fourth blocks. These free bits can be used to transfer data. The other bits are already reserved. The groups are identified by a group identifier, the so-called Group Type Code, carried in the second block. With this Group Type Code, comprising 4 bits, 16 different group types can be identified. Until now, each Group Type identifies a separate data service, whereof some are program-related and some are not. Program-related data services are provide in, for example, group types 0 (basic tuning and switching information, providing a.o. alternative frequencies to the program), 1 (program item, number, etc.) 14 (Enhanced Other Networks, providing linking information for linking a network, comprising the received program, to another network. In the case the presently received network does not comprise traffic information, the EON feature provides a way of switching over to another network which does carry traffic information). Data services, which are not program-related, are provided in, for example, group types 5 (transparent data channel), 7 (Radio paging) and 8 (Traffic Message Channel). For detailed information on RDS, reference is made to "Specification of the radio data system (RDS)", EN50067, April 1992, published by CENELEC, Brussels, Belgium.

Figure 2:
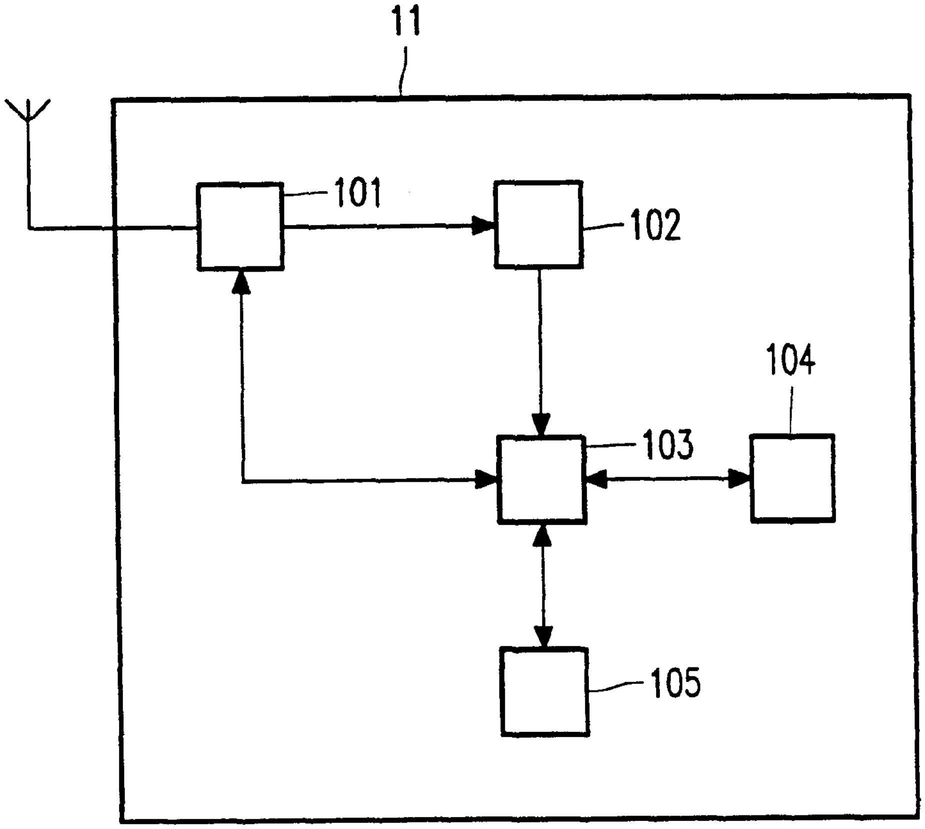
FIG. 2 shows a radio broadcasting receiver according to the invention.

FIG. 2 shows a radio broadcasting receiver according to the invention. The receiver 11 comprises receiving means 101 for receiving and demodulating information modulated on a carrier. An output of the receiving means 101 is coupled to a demodulating means 102, for demodulating the data signal, which may be separately modulated on a subcarrier. An output of the demodulating means 102 is coupled to a controller 103 for processing of the demodulated data signal. The controller 103 is coupled to a user interface 104 for receiving commands and displaying auditive and visual information. The controller 103 is also coupled to storing means 105 for storing data. The controller 103 is also coupled to the receiving means 101 for a.o. providing tuning information to the receiving means and receiving information concerning the tuning, for example, a tuning indicator for indicating if the receiving means 101 are properly tuned, a reception quality indication, etc. However, this is not essential to the invention. The receiver of FIG. 2 is especially suited for receiving a carrier frequency modulated by a program signal and a data signal, in this case a data signal according to the Radio Data System. The data signal in this system is modulated on a 57 KHz subcarrier.

In RDS, Group Type Code 8 is reserved for the data service: Traffic Message Channel. In this group, coded traffic messages are transmitted, which can be decoded in a receiver into visual and speech information, with the aid of a database. This database comprises information on traffic locations, traffic events in a visual and/or voice format. The coded traffic messages are implemented according to the Alert C protocol, for which reference is made to "Alert C, Traffic Message Coding Protocol", Proposed Pre-Standard, November 1990, published under supervision of the RDS ALERT Consortium. In the example for this invention, traffic messages according to the Alert C protocol are assigned a separate group type code. However, if the group type code is to be shared with another protocol, for instance Alert Plus, which is an extension on/successor of Alert C, one bit needs to be reserved for identifying the correct protocol. In the example, it will be assumed that only Alert C messages are transmitted. Now bit B4 in block 2 is used as follows: "0" identifies the remaining 36 bits as comprising an Alert C message, and "1" identifies the remaining 36 bits as comprising supplementary information. As the invention deals with the supplementary information, the Alert C messages will not be explained any further. When supplementary information is transmitted, identified with B4="1", bits B4 . . . B0 comprise an address number for identifying different parts of the supplementary information.

Figures 3A, 3B, 3C, 3D, 3E, 3F, 3G:
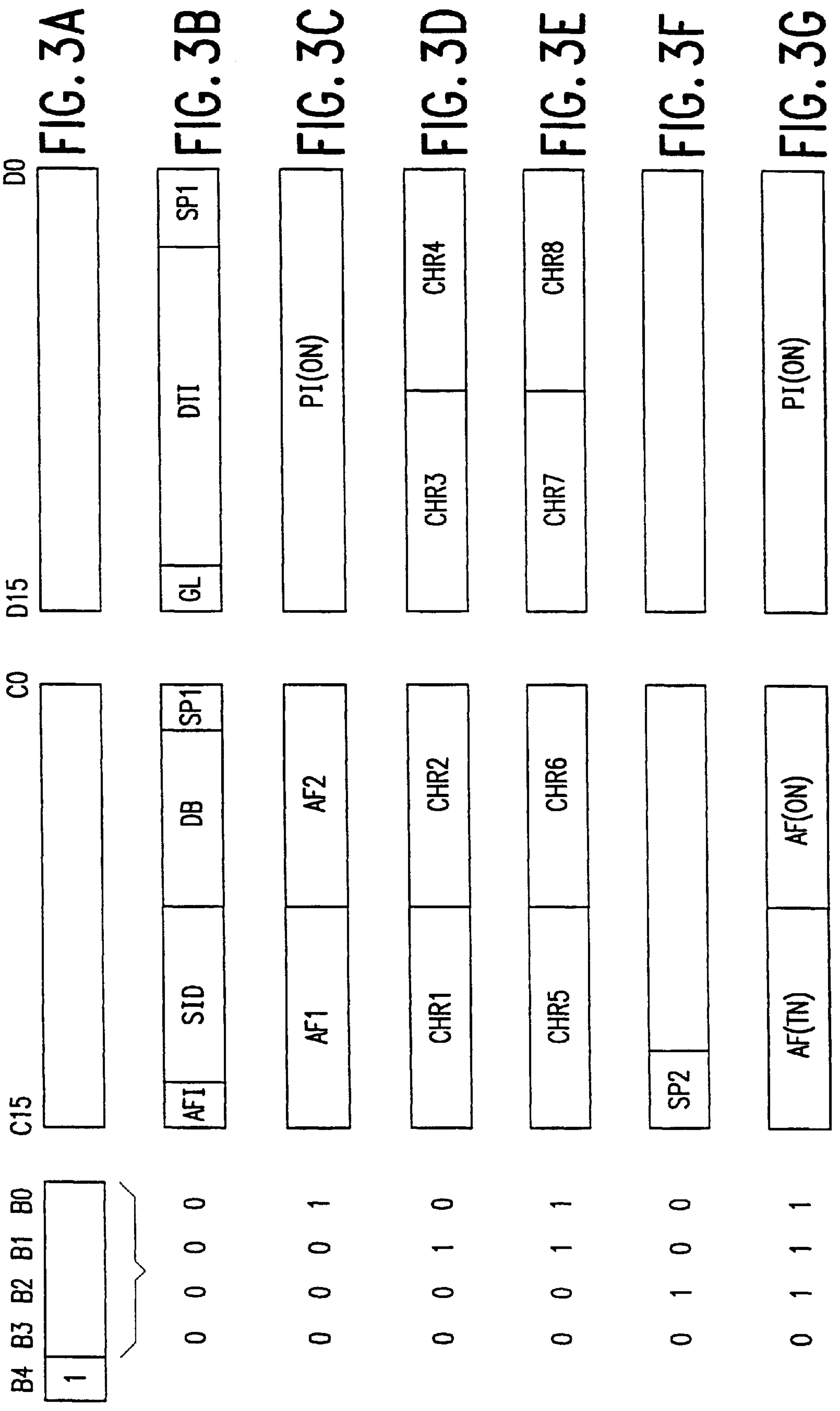
FIGS. 3A . . . 3N show diagrams of RDS TMC groups comprising supplementary information according to the invention.
Figures 3H, 3I, 3J, 3K, 3L, 3M, 3N:
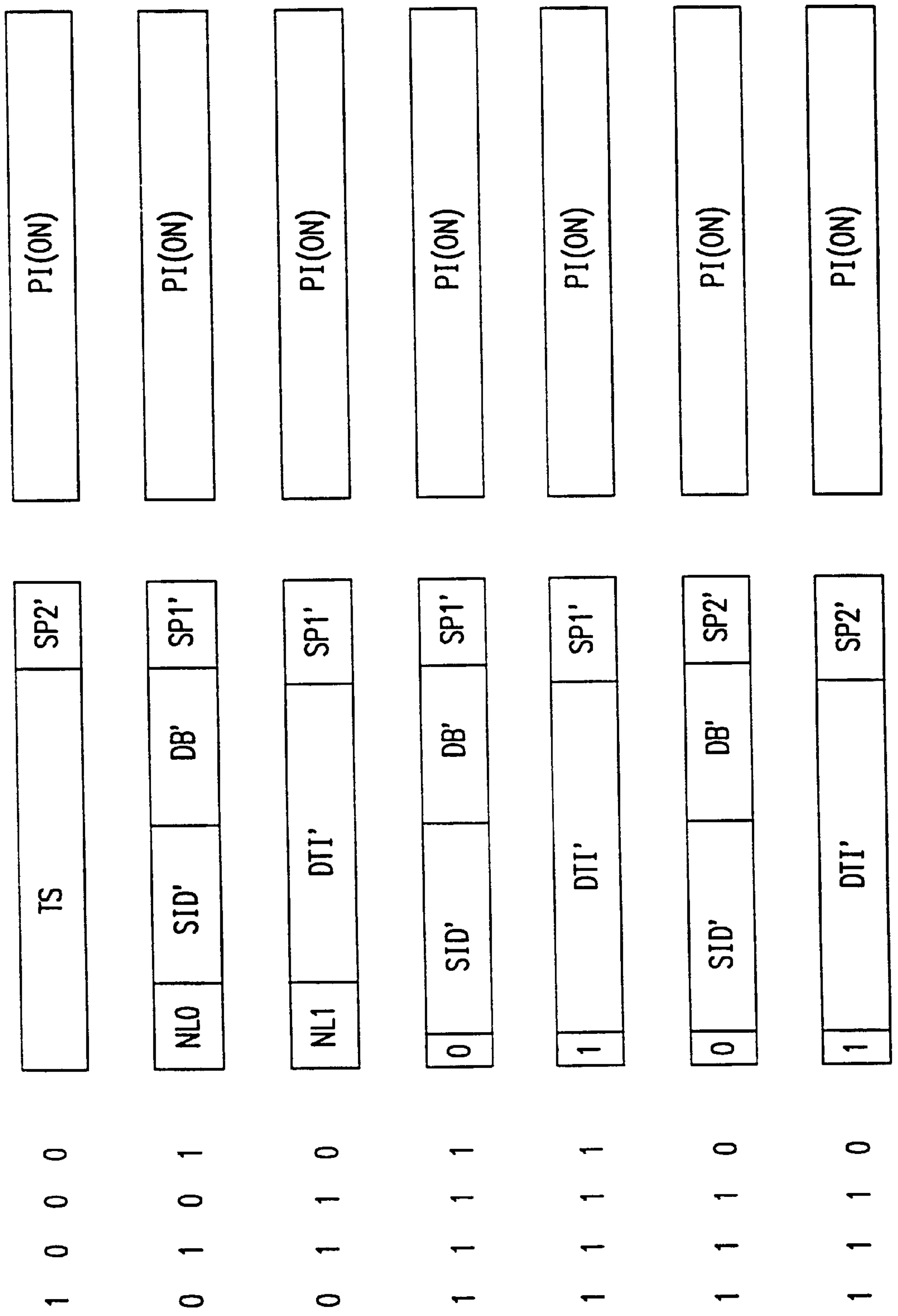

FIGS. 3A . . . 3N show diagrams of RDS TMC groups comprising supplementary information according to the invention. FIG. 3A shows the remaining 37 free bits of an RDS group, divided into 3 parts: 5 bits (B4 . . . B0) in the second block, 16 bits (C15 . . . C0) in the third block and 16 bits (D15 . . . D0) in the fourth block. The data identified by address number "0000" comprises the following information (see FIG. 3B):

- an Alternative Frequencies Indicator AFI (1 bit). This Alternative Frequencies Indicator is set to "1" if the data service can use the alternative frequencies of the program presently received. If the list of alternative frequencies of the data service makes no use of the list of alternative frequencies of the presently received program, then the AFI is set to "0".
- a Service Identification SID (8 bits). This Service Identification serves to identify a service provider, providing the data service. This SID is to be appointed by an authorized body.
- a Data Type Identifier DTI (11 bits). This Data Type Identifier or rather data service identifier serves to identify the data service. In the case of TMC, this is an identifier identifying the Alert C protocol or the Alert Plus protocol.
- a Database Number DB (6 bits). In the example of TMC, this database number identifies the database to which the data in the service pertains. This database is needed, for example, for decoding traffic message locations and events and can comprise the translations to visual or spoken text of coded traffic messages. For other data services, this database may contain necessary decoding or translation information needed to decode the data in the data service.
- a Service Profile SP1 (5 bits). In the FIG. 3B, 1 bit of SP1 is put in block 3 and the other 4 bits are put in block 4. The first bit of the 5 bits indicates if the service is a pan-european service. The second bit indicates if it is a national service, the third bit indicates if it is a supra regional service, the fourth bit if it is a regional service, and the fifth bit indicates if it is a local or urban service. These 5 bits can be set independently of each other, meaning that a data service can be both supra regional and national or any combination of the 5 possibilities. The Service Profile SP1 thus describes an area coverage of the basic TMC service.
- a Generic Link indicator GL (1 bit). If this bit is set to "0", no generic link is allowed. If the bit is set to "1" a generic link is allowed, meaning that the present program with PI-code PQRS (wherein each letter stands for 4 bits) is generically linked to programs with PI-codes PxRS, wherein x ranges from 4 to F in hexadecimal notation.

Thus the group with address "0000" provides supplementary information, relating to the data service itself. This information can be used to determine if the received data service is the correct one. For instance, if the service provider is not the one expected, the data service may also not be entirely the one expected and vice versa. If a receiver does not have a database with the correct number, then it may not be able to decode the data of the data service. If a user is interested in a certain area coverage of the service, for instance, a national coverage, the user may not want a data service which is only regional. So these items of information can all be used to select and/or identify a data service.

Address "0001" can be reserved for transmitting alternative frequencies on which the data service can also be received. If the data service has the same AFs as the accompanying program, the AFI is set to indicate that the AFs of the program can be used. If, however, the AFs of the data service are not the same, or there are more AFs than only those of the program, the address "0001" provides capacity for transmitting these AFs. Together with these alternative frequencies, a PI code of the program on the alternative frequency can be transferred, providing a check for the receiver to see if the correct program for receiving the data service is received. The alternative frequencies transferred with this address code are preferably no alternative frequencies of the program, presently received, as this information is already transmitted in the 0A groups of RDS. The method of transmitting the alternative frequencies may be the same as defined for the 0A groups. Thus, a mapping of AFs is done, together with adding the PI code of the program received at the second alternative frequency. Thus block 3 in FIG. 3C comprises two a pair of alternative frequencies and block 4 comprises the PI code belonging to the program, received on the other alternative frequency.

Addresses "0010" and "0011" in FIG. 3D and 3E, respectively, can be reserved for transferring a total of 8 8-bit characters CHR1 . . . CHR8 for display purposes, 4 characters in the remaining data field of 32 bits for each address. These characters may be used to display, for example, the name of a service provider providing the data service. In this way, it is similar to the characters of the Program Service name, transferred in the 0A and 0B groups of RDS.

Address "0100" in FIG. 3F may be used for transferring a service profile SP2, similar in format to SP1, of the supplementary services, i.e., of those TMC groups, wherein bit B4 is set to "1". This service profile may thus differ from the service profile SP1 of the basic TMC service (identified by bit B4 being set to "0"), but need not be implemented.

Addresses "0101", "0110", "0111" and "1000" (FIGS. 3I, 3J, 3G and 3H, respectively) can be reserved for transferring information for linking the data service to data services provided on other networks. This linking is similar to the linking provided by the EON feature of RDS, but the EON feature is only related to the program signal and not to a data service, comprised in the data signal. Thus, the invention provides an EON-like feature for data services. Addresses "0101" and "0110" are reserved for information pertaining to the data service on the other network. This data is substantially the same as the one in the group with address "0000", but now it is divided into two groups, wherein the information SID', DB' and 1 bit of SP1', similar to the content of block 3 with address "0000" (SID, DB and 1 bit of SP1), is placed in block 3 with address "0101" and the information DTI' and 4 bits of SP1', similar to the content of block 4 with address "0000" (DTI and 4 bits of SP1), is placed in block 3 with address code "0110". Blocks 4 with addresses "0101" and "0110" both comprise the program identification code (PI(ON) of the other data network. Blocks 3 contain as first bit an NL0 and an NL1 bit, these two bits indicating the type of link similar to the links as used in EON. If both bits are "0", no linking is allowed. If NL0="1" and NL1="0", then a generic link is allowed, which is similar to the generic link as used in the GL bit, indicating that the second 4 bits of the PI-code may have a value ranging from 4 . . . F in hexadecimal notation. If NL0="0" and NL1="1", then an extended generic link is present, wherein the last 4 bits of a PI-code may have a value ranging from 0 to F in hexadecimal notation. If both NL1 and NL0 are "1", then both a generic and an extended generic link is allowed. Address "0111" can be reserved for providing alternative frequencies of the other network, together with the PI code of the other network PI(ON). Preferably, the alternative frequencies are provided in mapped pairs, wherein one frequency AF(TN) of the pair is an alternative frequency of the present data service, and the other frequency AF(ON) in the pair is an alternative frequency of the data service in the other network, to which the present data service is linked. Preferably, the transmitters transmitting on the frequencies in a mapped frequency pair have the same area coverage or location and range. This mapping is similar to the mapping of alternative frequencies in the EON feature. Address "1000" can be reserved for providing timeslot information TS on the time when the data service in the other network is present, as it is possible that a data service is not always present in a network, but only during certain moments. If not all the bits in the data field are used for providing this information, the remainder may be used for transferring the service profile SP2' of the supplementary information transmitted in the other data service and the PI code PI(ON) of the other data service as well. By transmitting the groups with addresses "0101", "0110", "0111" and, optionally, "1000", a receiver is provided with all the necessary information for a successful switch-over from this data network to another data network upon reception of a trigger, indicating the moment of switch-over.

Addresses "1111" and/or "1110" can be used for providing the trigger. When a receiver has all the switching information and receives groups with address "1111" and/or "1110" the receiver will switch over to the program identified by the PI code of the other network, carrying the other data service. It is also possible to put the switch-over information partially in the trigger, i.e., in the data field of the groups with address "1111" (and/or "1110"). For this purpose, the address "1111" is reserved for providing two variants, identified by the first bit in block 3. When C15="0", the contents of the remaining 31 bits are the same as the last 31 bits of the group with address "0101" and when C15="1", the contents of the remaining 31 bits are the same as the last 31 bits of the group with address "0110". If desired, the data field associated with address "1110" is the same as for the address "1111", differing in the service profile, which is now the service profile of the supplementary information of the other data service. However, the data pertaining to address "1110" is not essential, and address "1111" can be sufficient in practice for providing the trigger and some of the switching information.

Figure 4:
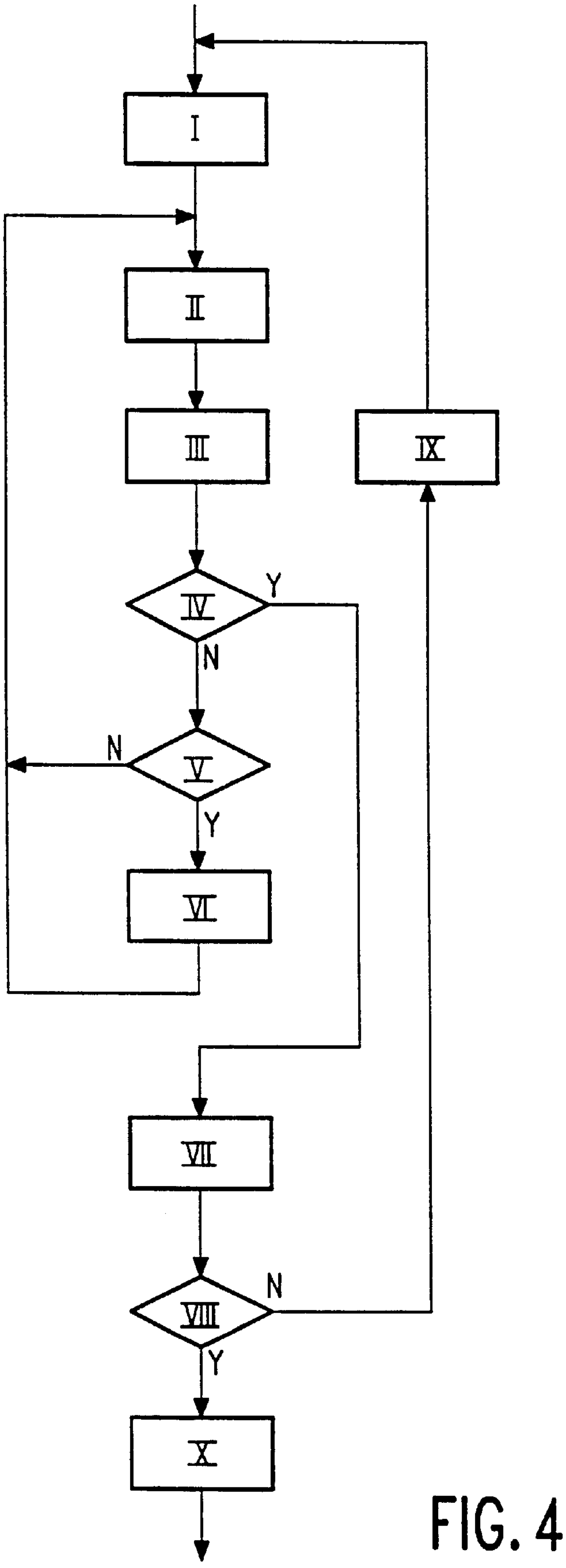
FIG. 4 shows a diagram of a first flowchart for use in the present invention.

FIG. 4 shows a diagram of a first flowchart for use in the present invention. The flowchart describes a selection of a service, wherein the supplementary information is stored depending on whether or not the service matches the wanted service. When the algorithm of FIG. 4 is implemented in the controller 103 of FIG. 2, the information can be stored in the storing means 105. In Table 1, a short description of the blocks of FIG. 4 is given.

TABLE 1

Description of the blocks of FIG. 4.

| Block | Description |
|---|---|
| I | Select an RDS TMC service |
| II | Determine GTC of service |
| III | Decode data |
| IV | Address = "0000"? |
| V | Address = "0001" . . . "1000"? |
| VI | Decode and store data temporarily |
| VII | Decode SID, DTI, DB, AFI, SP1 |
| VIII | Service matches wanted service? |
| IX | Temporary storage deleted |
| X | Temporary storage kept |

In block I, an RDS TMC service is selected. This selection can be made in various ways. It is possible to store the available services in a memory (for example, by the manufacturer or by a user himself) and select only those services a user is interested in. It can also be that the receiver has a learning capability, in that the receiver stores all the received services, therewith building up a local database of data services. A user can recall these services later on and make a selection of those services he is interested in. Furthermore, it can also be implemented dynamically: the moment a service is received, a user can give as command to ignore or store or even access that service. It can also be done automatically via a search for a desired service or through a link with another data service, as will be described in connection with FIG. 5.

Then, in block II, the Group Type Code of the service is determined. This block can be skipped if it is a prescribed Group Type Code (and the Group Type Code of the data service is already known). This block can also involve reading a table of data type identifiers with their links to a group type code, as described in a co-pending application of the Applicant. However, this is not part of the present invention. After determining the group type code, then the data in groups having the correct group type code (and bit B4 set to "1") are decoded in block III. The data in groups having the correct group type code, but B4 set to "0", may be processed according to the appropriate (Alert C) protocol. This is not related to the present invention, and is therefore not dealt with in more detail. Then, in block IV, it is checked if the address in the group is "0000". If the address is "0000", then, in block VII, the supplementary information on the data service is decoded, such as, SID, DTI, SP1, DB and AFI (the meaning of these abbreviations being explained previously). Following block VII, in block VIII, it is checked if the data service matches with the wanted or selected service. This check can be based on a correct service profile (SP1/2), or on a correct database DB, etc. In general, this check can involve any or any combination of the following items: SID, DTI, SP1 (, SP2) and DB. If the check answers positive (the service matches the wanted service), then, in block X, the temporarily stored data is kept; if the check is negative, then, in block IX, the temporarily stored data is deleted and the algorithm returns to the start. If, in block IV, the answer was no (no address of "0000"), then it is checked if the address is in the range of "0001" . . . "1000". If no, the algorithm returns to the start; if yes, then, in block VI, the data in the group is decoded and temporarily stored. Of course, after determining that the service matches with the wanted service, it is possible to keep on decoding the data in groups having addresses "0001" . . . "1000". However, the flowchart provides an example of how a selection of a data service can be implemented in a receiver, for example, the one of FIG. 2. It is not intended to be the only possible way to implement such a selection of a service.

Figure 5:
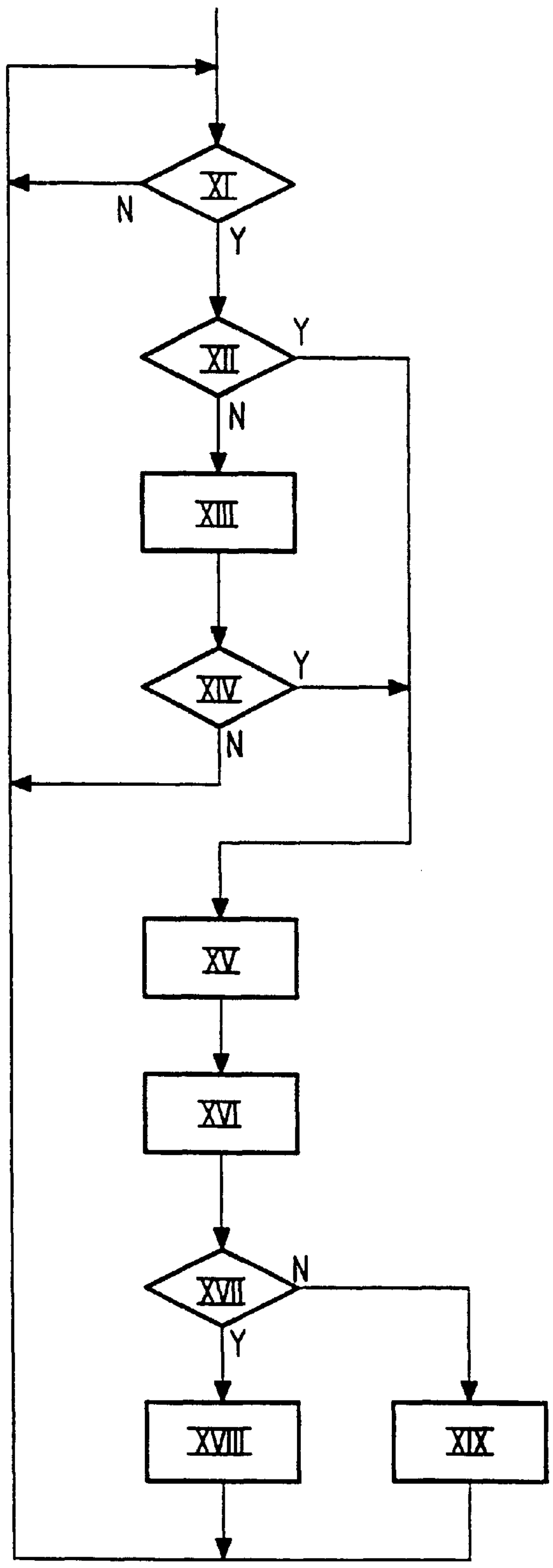
FIG. 5 shows a diagram of a second flowchart for use in the invention. In the figures, identical parts are provided with the same reference numbers. In the flow diagrams, a "Y" means that a condition in a block is met, and an "N" means that a condition in the block is not met.

FIG. 5 shows a diagram of a second flowchart for use in the invention. In Table 2 a short description of the blocks of FIG. 5 is given.

TABLE 2

Description of the blocks of FIG. 5.

| Block | Description |
|---|---|
| XI | Trigger received? |
| XII | Time > Tmax? |
| XIII | Decode trigger information |
| XIV | Trigger information complete? |
| XV | Tune to other network |
| XVI | Check SID, DTI, DB, SP1 (, SP2) |
| XVII | Check confirmed? |
| XVIII | Reset trigger information |
| XIX | Switch back |

In block XI, it is checked if a trigger, in the form of a group having an address equal to "1111" or "1110", is received. If the answer is no, the algorithm returns to its start. If the answer is yes, then, in block XII, it is checked if a time Tmax has elapsed. This time Tmax is the maximum time that can be waited upon, before a switch-over to the other network must take place, after the first reception of a trigger. If the time Tmax has not yet been elapsed, then the trigger information in the group, comprising the trigger, is decoded. Then, in block XIV, it is checked if all the trigger information is received. This involves reception of all variants of the groups with addresses "1111" and "1110". If the trigger information is not complete, then the algorithm goes back to the start and goes through blocks XI, XII, XIII and XIV again until the time Tmax has elapsed or the trigger information is complete. Then, in block XV, the receiver is tuned to the other network, indicated in the trigger information. In the case of a high-end receiver, the receiver switches directly to an Alternative Frequency of the other network, as received in a group carrying address "0111". In the case of a low-end receiver having no memory for alternative frequencies of the other network, a search is started for a program comprising the PI code of the other network PI(ON). When such a program has been found, the algorithm goes to block XVI and checks if the other network carries the proper data service, etc., by comparing the trigger information (SID, DTI, DB, SP1 (, SP2 if available), all belonging to the other network) entirely or partially with data found in a group with address "0000" in the other network, comprising information on the data service of the other network. Then, in block XIII, if the check is confirmed (and the correct other network was found), then the trigger information is reset and the receiver goes back to block XI, waiting for new trigger information and a new trigger. This trigger information and new trigger is supplied in the supplementary information of the data service of the other network for switching the receiver back to its original network or again another network. If the check is not confirmed (the correct other network was not found), then the receiver is switched back to the original network. In this example of switching, the trigger information is supplied in the trigger groups themselves. It is also possible to receive the trigger information in the groups with addresses "0101" and "0110" (and "1000" if SP2 is also needed as trigger information). In that case, if the trigger information has been received in its entirety, the switch-over can take place directly or at an appropriate moment without a further decoding of the trigger information in the trigger groups. The appropriate moment for a switch-over may be derived, if necessary, from the timeslot information in the group comprising address "1000", as this timeslot gives an indication when the other network will transmit the relevant data. How this is implemented, is yet to be decided. More important is that in the present invention, such information can be supplied. The search for a program carrying the PI code PI(ON) may be influenced by the bits NL0 and NL1 as provided in the groups with addresses "0101" and "0110", respectively (as described previously). These bits indicate how accurately the PI code of a found program must match the PI(ON) as received in the supplementary information. The algorithm described here is, of course, only applied to groups carrying supplementary information to the data service presently received, i.e., those groups with the correct group type and bit B4 set to "1". Thus, FIG. 5 shows an example of a possible implementation of a switch-over from a data service to another data service on another network. In this way, a feature similar to the EON feature is provided.

The algorithms of FIGS. 3 and 4 can be implemented in the controller 103 of the receiver, the algorithms of the previous figures can be implemented. Now the storing means 105 are used, for example, for storing the data, as in block X of FIG. 4. Furthermore, for comparing the trigger information with the decoded data from the other network in block XVI in FIG. 5, it may be necessary to store the decoded data. This may also be done in the storing means 105.

In the example given, the assumption is made that group type 8 comprises TMC. However, TMC may also be transmitted in another group type. The allocation of a data service to a particular group type is subject of a co-pending application of the Applicant, and is of no particular relevance to the present invention. This is also mentioned in connection with block II of FIG. 4.

In the previous example of RDS TMC, it is illustrated how—in general terms—supplementary information pertaining to a data network can be enclosed in a group, wherein a particular data service is transferred. This supplementary information allows an extensive identification of the data service and the service provider and also supplies information for switch-over to alternative frequencies carrying the same data network or even to alternative frequencies of other data networks, which are linked to the present data network. Through these measures, a very flexible and dynamic data service is created, wherein all the required supplementary information is provided within the same group as the data service itself, although it may be very well possible to provide the supplementary information in another group. This, however, requires a way of linking the group carrying the data service to the group carrying the supplementary information pertaining to the data service, which may result in more overhead and thus a reduced data capacity.

The algorithms of FIGS. 4 and 5 can be implemented in the receiver 11 of FIG. 2 in the controller 103. It is, of course, also possible to implement the algorithms in hardware.

Even though the invention is illustrated using the RDS TMC data service, the invention is not restricted to this application. It can also be applied to other data services in RDS. Furthermore, the invention is not restricted in its application to the Radio Data System, but can be used for any system, wherein a data service is transmitted from a number of transmitters, which may or may not belong to the same network. The invention can also be applied in a system for providing a data service, which data service is linked to another network, which may be transmitted on different transmitters. The invention can further be used in systems, wherein a program signal and a data signal are modulated onto a carrier, the data signal not comprising program-related data, but only data services. As may be readily understood, the type of modulation (AM/FM/etc.) is not essential to the invention, nor is the way the data signal is combined with the program signal for modulation onto the carrier.

What is claimed is:

1. A radio broadcasting system comprising a transmitter and a receiver for transmitting and receiving at least one program signal and a data signal, the data signal comprising information pertaining to an indicated program signal, characterized in that said system is the RDS system, and the data signal further comprises data of a data service and information pertaining to said data service.

2. The radio broadcasting system of claim 1, characterized in that the data signal is organized in groups having a group type code for distinguishing between different types of data and groups having the same group type code are used for transmitting the data of said data service and the information pertaining to said data service.

3. The radio broadcasting system of claim 2, characterized in that a group comprises a data bit for distinguishing remaining data bits as either comprising data of the data service or information pertaining to said data service.

4. The radio broadcasting system of claim 1, characterized in that the information pertaining to said data service comprises information on a related data service.

5. The radio broadcasting system of claim 4, characterized in that the information pertaining to the related data service comprises switching information for switching the tuning of the receiver to a frequency for receiving the related data service.

6. A radio broadcasting transmitter for transmitting at least one program signal and a data signal, the data signal comprising information pertaining to an indicated program signal, characterized in that said radio broadcasting transmitter transmits in accordance with the radio data system (RDS), and the data signal further comprises data of a data service and information pertaining to said data service.

7. A radio broadcasting receiver for receiving at least one program signal and a data signal in accordance with the radio data system (RDS), the data signal comprising information pertaining to an indicated program signal, characterized in that the data signal further comprises data of a data service and information pertaining to said data service.

8. A radio broadcasting method for transmitting and receiving at least one program signal and a data signal in accordance with the radio data system (RDS), the data signal comprising information pertaining to an indicated program signal, characterized in that the data signal further comprises data of a data service and information pertaining to said data service.

9. A radio broadcasting signal comprising at least one program signal and a data signal in accordance with the radio data system (RDS), the data signal comprising information pertaining to an indicated program signal, characterized in that the data signal further comprises data of a data service and information pertaining to said data service.

* * * * *